United States Patent Office 2,805,166
Patented Sept. 3, 1957

2,805,166

GLASSES CONTAINING OXIDES OF RARE EARTH METALS

Johannes Löffler, Witten (Ruhr), Germany

No Drawing. Application January 18, 1954,
Serial No. 404,795

13 Claims. (Cl. 106—47)

This invention relates to glasses of new and improved composition and has particular relation to a novel type of glasses consisting essentially of rare earth metal oxide-alumina-silicates. The invention also relates to the utilization of the new glasses and to a process for preparing said glasses.

Glasses containing oxides of rare earth metals have been known previously and in order to produce such glasses two different procedures have been hitherto used.

According to one of these procedures the oxides of rare earth metals are added, in amounts up to about 10%, to the well known conventional alkali-calcium-silicate glasses, or the rare earth metal oxides are substituted for the usual divalent oxides, such as CaO or PbO, in such glasses, in which alkali metal oxides serve as fluxing agents. In such compositions the proportion of the rare earth metal oxides can be hardly increased above 25%, because at higher proportions the glasses become too viscous and liable to be easily devitrified.

According to another know procedure oxides of rare earth metals are added to boric acid glasses, or boric acid-silica-glasses, or to borate glasses, in which the boric acid acts as a fluxing agent. Such glasses show the essential drawback that the boron trioxide is considerably volatile and, therefore, it easily happens that, for example in the production of optical glasses, in one and the same molten batch boron trioxide is present in the upper layers in smaller concentration than in lower layers and, owing to such differences of composition, the optical properties of glass produced in one batch, are not uniform.

I have now found that the above difficulties can be eliminated and a fundamentally new type of glass containing a high proportion of rare earth metal oxides can be obtained by using the oxides of rare earth metals in combination with alumina and silica, in the manner described hereinafter.

I have unexpectedly found that by combining oxides of the rare earth metals with alumina and $SiO_2$, glasses consisting essentially of rare earth metal oxide-alumina-silicates are obtained, which can be melted at conventional glass-melting temperatures and show a low viscosity in molten condition. As the presence in conventional glass compositions of oxides of rare earth metals by themselves, as well as the presence of alumina by itself, causes an increase of viscosity of the molten glass, it was entirely unexpected that glasses consisting essentially of rare earth metal oxide-alumina-silicates are low-melting and of low viscosity.

Thus, the glasses embodying the present invention are different from both of the before mentioned known types containing rare earth metal oxides and represent a hitherto unknown, novel type, which is either substantially free from the conventional fluxing agents, i. e. alkali metal oxides and boric acid, or contains only small amounts of the latter which are insufficient to exert a substantial fluxing effect.

In carrying out the present invention, the proportion rare earth metal oxides:alumina:$SiO_2$ can be varied and oxides of any rare earth metal or mixtures containing two or more rare earth metal oxides in any proportion, can be used. Thus, in carrying out the present invention oxides of scandium, yttrium, lanthanum, cerium, praseodymium, neodymium, samarium, europium, gadolinium, terbium, dysprosium, holmium, erbium, thulium, ytterbium, lutetium, illinium, and mixtures of oxides of any of two or more of these elements, in any desired proportion, can be used. The oxides of these various metals have practically equal effects when used in glasses embodying the present invention, apart from the coloring effect of certain individual oxides and the splitting off of oxygen in the use of $CeO_2$ as an ingredient. Therefore, if in glasses of the present invention, the oxide of one rare earth metal is substituted by a chemically equivalent amount of the oxides of another rare earth metal or metals, apart from a possible change in color, no practically essential change in the properties of the glass will occur. In view of this, for economical reasons, in commercially practicing the invention it is preferable to use commercially available mixtures of oxides of two or more rare earth metals.

In order to improve the vitrescent characteristics of glasses embodying the present invention, it has been found to be of advantage to use the rare earth metal oxide-alumina-silicates in mixture with minor amounts of divalent metal oxides or alumina silicates of the latter. The total amount of these admixtures should not exceed 10% by weight, based on the weight of the total composition. In carrying out the invention, the following oxides of divalent metals can be used: BeO, MgO, CaO, SrO, BaO, PbO, ZnO, CdO. Individual oxides or mixtures of two or more of them in any desired proportion can be used.

Furthermore, in order to improve the vitrescent characteristics of glasses according to the invention small amounts of boron trioxide, and/or phosphoric acid, and/or small amounts of alkalies and/or other typical glass ingredients, such as clarifying agents, agents causing opacity, etc. can be added to the glass composition. Based on the total weight of the composition, the amount of boron trioxide should not exceed 5%, the amount of alkali oxides should not exceed 2% and the amount of phosphoric acid should not exceed 0.5%, by weight, if not used as opacifier.

The following examples describe some embodiments of the invention to which the invention is not limited. The parts are by weight if not otherwise stated.

*Example 1*

A glass is prepared in conventional manner from the following ingredients:

| | Percent by weight |
|---|---|
| $La_2O_3$ | 30 |
| BeO | 5.5 |
| $K_2O$ | 0.5 |
| $Al_2O_3$ | 18.0 |
| $SiO_2$ | 46.0 |

The above ingredients yield an easily refinable glass, which melts at 1350° C. and shows excellent properties for the manufacture of instruments, utensils and appliances. Its thermal expansion is lower than that of hard porcelain, and shows very little tendency of divitrification and can be, therefore, processed in any desired manner by blowing. Owing to its very low contents of alkali metal oxides it has practically complete stability (hydrolytic stability) in contact with water, its resistance to acids is satisfactory, while its resistance to alkaline agents is higher than that of any other glass hitherto known.

*Example 2*

A glass free from alkali metal compounds can be prepared in the manner and from the ingredients described in Example 1, with the omission of $K_2O$. Such glass can be used for special purposes, for which glass free from alkali metal compounds is required.

In the above examples $La_2O_3$ can be partly or entirely substituted by equal amounts of oxides of any of the other rare earth metals, such as $Nd_2O_3$, $Pr_2O_3$, or $Ce_2O_3$, preferably by mixtures of these oxides recovered without their chemical separation, from naturally occurring rare earth metal ores. Furthermore $K_2O$ can be substituted by other alkali metal oxides, such as sodium oxide or lithium oxide and these oxides can be used up to 2% by weight, without change in the character of the glass.

Example 3

A glass is prepared in conventional manner from the following ingredients: 2.0% of $ThO_2$; 26.96% of oxides of rare earth metals, such as 13.05% of $Ce_2O_3$, 7.48% of $La_2O_3$, 3.92% of $Nd_2O_3$, 1.30% of $Pr_2O_3$, 0.43% of $Sm_2O_3$, 0.5% of $Y_2O_3$ and 0.28% of a mixture of other rare earth metal oxides, said mixture consisting of oxides of europium, gadolinium, terbium, dysprosium, holmium, erbium, thulium, ytterbium, and cassiopeium; 1.0% of $Li_2O$; 1.0% of $Na_2O$; 5% of oxides of divalent metals, such as 2.5% of MgO, 1.5% of CaO, and 1.0% of ZnO; 17.8% of $Al_2O_3$; 0.2% of $P_2O_5$ and 46.0% of $SiO_2$. In this composition an equal amount of other mixtures containing other rare earth metal oxides or the above rare earth metal oxides in different proportions, can be substituted for the above specified 26.96% of rare earth metal oxides, and an equal amount of other oxides of divalent metals can be substituted for the above specified 5% of such oxides.

In the glass produced from the above ingredients, the oxide of cerium is substantially present in the trivalent form. But the cerium compound can be added to the glass composition also in the tetravalent form, and in this case it is advisable to add to the composition also a substance e. g. sugar, or a metal such as Al capable of binding oxygen, in order to chemically react with the oxygen set free from the tetravalent cerium compound. The proportion of rare earth metal oxides in the above composition can be increased up to 70%. Glasses containing such proportions of rare earth metal oxides, can be melted at conventional glass-melting temperatures and refined by conventional procedures. Glasses containing 40%, or more, of rare earth metal oxides attack the melting vessels of clay and must be, therefore, melted with the conventional precautionary steps, particularly if the glasses are supposed to be used for optical purposes.

Example 4

A glass is prepared by the conventional procedure from the following ingredients:

| | Percent by weight |
|---|---|
| $La_2O_3$ | 60 |
| BeO | 3.1 |
| $Al_2O_3$ | 11.8 |
| $SiO_2$ | 24.9 |
| $As_2O_5$ | 0.2 |

This glass has a refractive index of about 1.72 and an Abbe number slightly higher than 51, i. e. it has a very high refractive power, but still belongs to the crown glasses with low color dispersion. In comparison with the above mentioned borate-containing glasses, it has the advantage that it does not contain volatile constituents and, therefore, no change of composition can occur by volatilization during melting.

In this example, $La_2O_3$ can be substituted by $ThO_2$ up to 15%, preferably in an amount of 10%, based on the total weight of the mixture. Such substitution results in an increase of the refractive index, without substantially increasing color dispersion. For example, a glass having a refractive index above 1.75 and an Abbe number of 50 is obtained according to the present invention from the following ingredients:

| | Percent |
|---|---|
| $La_2O_3$ | 45.0 |
| $ThO_2$ | 15.0 |
| BeO | 2.1 |
| CdO | 1.1 |
| $Al_2O_3$ | 11.8 |
| $SiO_2$ | 24.9 |
| $As_2O_5$ | 0.1 |

In glasses prepared according to the present invention, in which naturally occurring mixtures of rare earth metal oxides are used, $ThO_2$ can be also used as an ingredient, in most cases in an amount below 10%, based on the total weight of the glass composition.

Example 5

In carrying out the present invention, rare earth metals forming colored compounds can also be used and the glasses thus obtained can be applied to optical purposes in view of the selective absorption characteristics of said compounds, as well to jewelry, in view of their beautiful color. The use in jewelry is somewhat impaired by the low color dispersion of the glasses and it is, therefore, preferred to add to the glass lead oxide, which, as known, has a color-dispersing or scattering effect. For example a glass of bright and brilliant green color, which cannot be produced by other ingredients, is obtained from the following materials:

| | Percent by weight |
|---|---|
| $Pr_2O_3$ | 54 |
| PbO | 10 |
| $Al_2O_3$ | 11 |
| $K_2O$ | 0.5 |
| $SiO_2$ | 24.5 |

This glass is highly suitable for jewelry.

Example 6

A bright-red colored glass suitable for use in jewelry is obtained from the following materials:

| | Percent by weight |
|---|---|
| $Nd_2O_3$ | 54 |
| PbO | 10 |
| $Al_2O_3$ | 11 |
| $K_2O$ | 0.5 |
| $SiO_2$ | 24.5 |

Example 7

A glass is prepared by the conventional procedure from a mixture of the following ingredients:

| | Percent |
|---|---|
| $Nd_2O_3$ | 32.5 |
| $Pr_2O_3$ | 3.2 |
| $La_2O_3$ | 18.3 |
| BaO | 2.0 |
| PbO | 7.9 |
| $Al_2O_3$ | 9.0 |
| $K_2O$ | 0.5 |
| $SiO_2$ | 21.5 |
| $As_2O_5$ | 0.1 |
| $B_2O_3$ | 5.0 |

The oxides of the above named rare earth metals can be partly or entirely substituted by oxides of other rare earth metals and the proportions of the individual oxides of rare earth metals can be varied.

It will be understood by those skilled in the art that the present invention is not limited to the specific starting materials, proportions, steps and other details specifically disclosed and can be carried out with various modifications. For example, the rare earth metal oxides can be used in any proportion in the range of 10-70%, and the alumina can be used in any amount in the range of 10-20%. Oxides of glass-forming divalent metals are used preferably in the range of 0.5 to 10%; alkali metal oxides in the range of 0.1 to 2.0%, preferably in the range of 0.3-1.0%, and boron trioxide preferably in the range of 0.5 to 5.0%, the balance of glass composition being silica. Clarifying and opacifying agents can be used in conventional proportions. If oxides of several rare earth metals are used in mixture with each other in the glasses according to this invention, the individual oxides can be present in such mixtures in any desired proportions, because in view of the substantially equal chemical and technical effects of the individual rare earth metal oxides, the latter can be substituted for each other, apart from the coloring effect. For example, the individual oxides can be used in equivalent amounts, or in equal proportions by weight, or one or more of the oxides can be present in relatively large proportions, while other oxides are present in relatively small proportions. As mentioned above, it is often preferred to use the commercially available rare earth metal oxide mixtures, in which the proportions of the individual oxides depend on the composition of the ores, from which the oxide mixtures are prepared. These and other modifications can be made without departing from the scope of the invention, as defined in the appended claims.

BeO can be used in glasses according to the invention preferably in the range of 1.0-6.0%, $ThO_2$ preferably in the range of 3-15%, PbO preferably in the range up to 10%. A preferred composition contains 10-40% of mixed rare earth metal oxides, as obtained from natural ores, 2.0-7.0% of glass forming divalent metal oxides, up to 2.0% alkali metal oxides, 15-20% by weight of $Al_2O_3$ and the balance $SiO_2$.

Oxides of divalent metals other than those mentioned above, such as divalent manganese, iron, cobalt, nickel and copper, which have a more or less strong coloration, can also be incorporated in glasses according to the invention, but their use offers no advantage in comparison with oxides of said above mentioned divalent metals. The individual ingredients described in the examples can be introduced into the mixture of starting materials in any suitable form, such as oxides, oxide hydrates, or salts of volatile acids, provided such acids do not adversely affect the glass composition or the glass melt. Fluorine can be used in the form of a metal fluoride. $B_2O_3$ can be introduced into the glass composition as such, or in the form of a suitable compound, such as strontium borate or barium borate in the above Example 8, or in the form of lead borate in the above Example 7. However, the use of borates instead of $B_2O_3$ does not offer advantages, because the borates are prepared from $B_2O_3$.

The term "glass forming divalent oxides of metals" is used to denote metals, the oxides of which are adapted to form components of glasses embodying the present invention.

Reference is made to my co-pending application Ser. No. 261,374 filed on December 12, 1951, now abandoned, of which this is a continuation-in-part.

In the present application, the parts or percent are based on weight if not otherwise stated.

What is claimed is:

1. As a new product, glass formed substantially by rare earth metal oxide-alumina-silicates and consisting of 10-70% by weight of at least one rare earth metal oxide, 10-20% by weight of $Al_2O_3$, and the balance $SiO_2$, the amount of $SiO_2$ being in the range of about 21.5-46.0% by weight.

2. As a new product, glass as claimed in claim 1, which contains, as an additional ingredient, 0.5 to 10% by weight of a glass-forming oxide of divalent metals.

3. As a new product, glass as claimed in claim 1, which contains, as an additional ingredient, 0.5 to 5% by weight of boric acid.

4. As a new product, glass as claimed in claim 1, which contains, as additional ingredients, 0.5 to 10% by weight of a glass-forming oxide of divalent metals and 0.5 to 5% by weight of boric acid.

5. As a new product, glass as claimed in claim 1, which contains, as an additional ingredient, 0.1 to 2% by weight of an alkali metal oxide.

6. As a new product, glass as claimed in claim 1, which contains, as additional ingredients, 0.5 to 10% by weight of a glass-forming oxide of divalent metals and 0.1-2.0% by weight of an alkali metal oxide.

7. A glass as claimed in claim 1, in which the rare earth metal oxide is $La_2O_3$ and is present in the glass in an amount of 10-70% by weight and the glass contains, as additional ingredients, 1.0 to 10% by weight of glass-forming oxides of divalent metals, of which up to 6% by weight is BeO.

8. A glass as claimed in claim 1, in which the rare earth metal oxide is $La_2O_3$ and is present in the glass in an amount of 10-67% and the glass contains, as additional ingredients, 3-15% $ThO_2$ and 1.0 to 10.0% by weight of glass-forming oxides of divalent metals, of which up to 6% by weight is BeO.

9. A glass as claimed in claim 1, in which the rare earth metal oxide is $Pr_2O_3$ and is present in an amount of 10-70% by weight.

10. A glass as claimed in claim 1, in which the rare earth metal oxide is $Nd_2O_3$ and is present in an amount of 10-70% by weight.

11. A glass as claimed in claim 1, in which the rare earth metal oxide is $Pr_2O_3$ present in the amount of 10-70% by weight and the glass contains, as an additional ingredient, about 10% by weight of PbO.

12. A glass as claimed in claim 1, in which the rare earth metal oxide is $Nd_2O_3$ present in the amount of 10-70% and the glass contains, as an additional ingredient, about 10% by weight of PbO.

13. A glass as claimed in claim 1, substantially consisting of a mixture of rare earth metal oxides in the amount of 10-40% by weight, glass-forming oxides of divalent metals in the amount of 2.0-7.0% by weight, 0.0-2.0% by weight of alkali metal oxides, 15-20% by weight of $Al_2O_3$ and the balance $SiO_2$.

References Cited in the file of this patent

FOREIGN PATENTS

| | | |
|---|---|---|
| 351,245 | Great Britain | (1931) |
| 255,914 | Switzerland | (1948) |